US009896102B2

(12) United States Patent
    Tanaka

(10) Patent No.: US 9,896,102 B2
(45) Date of Patent: Feb. 20, 2018

(54) VEHICLE CONTROLLER

(71) Applicant: SUBARU CORPORATION, Tokyo (JP)

(72) Inventor: Yuichi Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 48 days.

(21) Appl. No.: 14/810,227

(22) Filed: Jul. 27, 2015

(65) Prior Publication Data

US 2016/0023659 A1    Jan. 28, 2016

(30) Foreign Application Priority Data

Jul. 28, 2014 (JP) ................................ 2014-152924

(51) Int. Cl.
    *G05D 1/00*      (2006.01)
    *B60W 30/17*     (2012.01)
    *B60W 10/06*     (2006.01)
    *B60W 10/08*     (2006.01)
    *B60W 10/107*    (2012.01)
            (Continued)

(52) U.S. Cl.
    CPC ............ *B60W 30/17* (2013.01); *B60W 10/06* (2013.01); *B60W 10/08* (2013.01); *B60W 10/107* (2013.01); *B60W 10/184* (2013.01); *B60W 20/15* (2016.01); *B60W 30/16* (2013.01); *B60W 30/18018* (2013.01); *B60W 30/18127* (2013.01); *B60K 6/445* (2013.01); *B60W 20/00* (2013.01); *B60W 20/14* (2016.01); *B60W 2550/302* (2013.01); *B60W 2550/308* (2013.01); *B60W 2710/0644* (2013.01); *B60W 2720/106* (2013.01); *Y02T 10/48* (2013.01); *Y02T 10/6239* (2013.01); *Y02T 10/6286* (2013.01); *Y10S 903/93* (2013.01)

(58) Field of Classification Search
    CPC ...... B60W 30/17; B60W 10/06; B60W 10/08; B60W 10/107; B60W 10/184; B60W 20/108; B60W 30/16; B60W 30/18018; B60W 30/18127; B60W 20/14; B60W 20/00; B60W 2550/302; B60K 6/445
    See application file for complete search history.

(56) References Cited

U.S. PATENT DOCUMENTS 5,452,947 A *   9/1995   Ehmer .................. B60T 8/1764
                                                303/150
2006/0017414 A1* 1/2006  Joe ........................ B60K 6/445
                                                318/432
(Continued)

FOREIGN PATENT DOCUMENTS

JP       2009-024529 A     2/2009

OTHER PUBLICATIONS

JP2000/211383, Itsuro et al, Feb. 8, 2000.*

*Primary Examiner* — Ian Jen
(74) *Attorney, Agent, or Firm* — McDermott Will & Emery LLP

(57) ABSTRACT

A vehicle controller includes a camera unit that detects driving conditions of a preceding vehicle; a re-acceleration determiner that determines based on the driving conditions of the preceding vehicle whether or not a re-acceleration state in which the preceding vehicle decelerates and then accelerates occurs; and a rotation controller that, if it is determined that the vehicle is in a re-acceleration state, maintains the engine speed of the engine not less than a lower limit.

8 Claims, 10 Drawing Sheets

(51) Int. Cl.

| | |
|---|---|
| *B60W 10/184* | (2012.01) |
| *B60W 30/16* | (2012.01) |
| *B60W 30/18* | (2012.01) |
| *B60W 20/15* | (2016.01) |
| B60K 6/445 | (2007.10) |
| B60W 20/00 | (2016.01) |
| B60W 20/14 | (2016.01) |

(56) References Cited

U.S. PATENT DOCUMENTS

| | | | | |
|---|---|---|---|---|
| 2007/0213904 | A1* | 9/2007 | Watanabe | B60T 8/1706 701/45 |
| 2011/0127938 | A1* | 6/2011 | Kawakami | G01P 3/481 318/400.13 |
| 2013/0029805 | A1* | 1/2013 | Matsuo | B60W 10/06 477/5 |
| 2013/0131965 | A1* | 5/2013 | Attensperger | F02D 41/022 701/110 |
| 2014/0121925 | A1* | 5/2014 | Yoon | B60W 10/02 701/68 |
| 2014/0129101 | A1* | 5/2014 | Tokura | F16H 61/66259 701/60 |
| 2014/0200112 | A1* | 7/2014 | Tokura | F16H 61/66272 477/37 |
| 2014/0200777 | A1* | 7/2014 | Dufford | B60W 10/105 701/54 |
| 2016/0023659 | A1* | 1/2016 | Tanaka | B60W 30/17 701/22 |
| 2016/0153374 | A1* | 6/2016 | Tashiro | F02D 41/10 701/103 |

\* cited by examiner

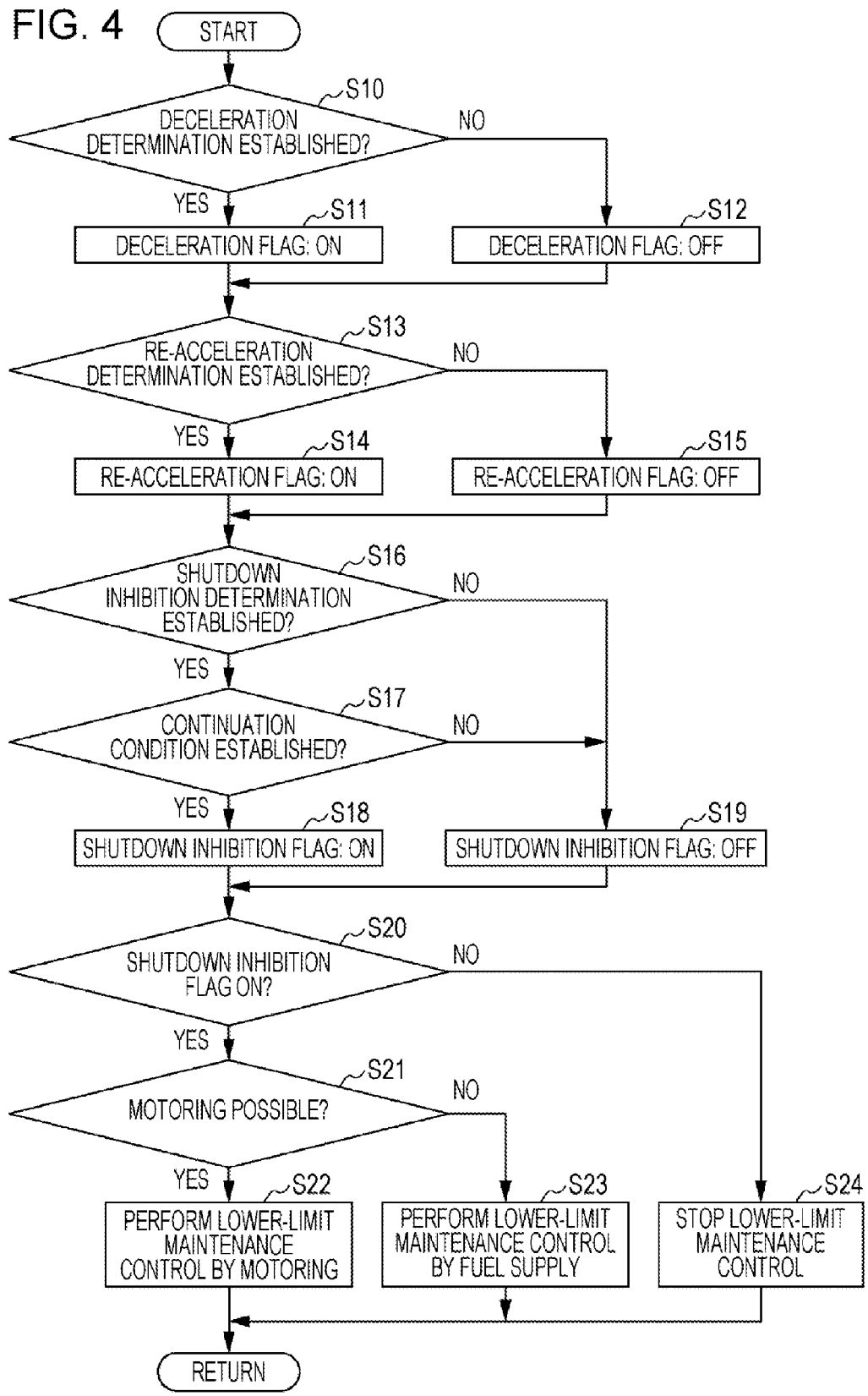

VEHICLE CONTROLLER

CROSS REFERENCES TO RELATED APPLICATIONS

The present application claims priority from Japanese Patent Application No. 2014-152924 filed on Jul. 28, 2014, the entire contents of which are hereby incorporated by reference.

BACKGROUND

1. Technical Field

The present invention relates to a vehicle controller provided with a sensor that detects a driving condition of a preceding vehicle.

2. Related Art

A hybrid vehicle provided with an electric motor and an internal combustion engine as power sources actively shuts down the engine depending on the driving condition in order to reduce the fuel consumption of the engine. There has also been developed a vehicle provided with an engine as a power source that shuts down the engine before the vehicle comes to a stop when the speed of the vehicle falls below a predetermined level in order to reduce the fuel consumption of the engine.

When the driver of such a vehicle that shuts down the engine during running depresses the accelerator pedal to accelerate the vehicle, the vehicle needs to restart and rev up the engine. Accordingly, response associated with the acceleration is degraded. To solve this problem, there has been proposed a hybrid vehicle that inhibits engine shutdown when a vehicle is running on a ramp of an expressway in order to improve the response associated with vehicle acceleration (Japanese Unexamined Patent Application Publication (JP-A) No. 2009-24529).

Based on location information received from a navigation system, the hybrid vehicle described in JP-A No. 2009-24529 determines whether or not a road on which the vehicle is running is a ramp of an expressway and, when determining that the road is a ramp, inhibits the engine shutdown. However, a situation where good vehicle acceleration performance is needed cannot be determined by the type of road only, and is dependent on other vehicles' driving conditions. For this reason, it is desirable that the response associated with vehicle acceleration is improved under various driving conditions, in addition to operation on a specific road.

SUMMARY OF THE INVENTION

Accordingly, it is an object of the present invention to improve response associated with vehicle acceleration.

An aspect of the present invention provides vehicle controller a vehicle controller including: a sensor that detects a driving condition of a preceding vehicle; a re-acceleration determiner that determines based on the driving condition of the preceding vehicle whether or not a re-acceleration state where the preceding vehicle decelerates and then accelerates occurs; and a rotation controller that, if it is determined that the re-acceleration state occurs, maintains a rotational speed of an engine not less than a lower limit.

BRIEF DESCRIPTION OF THE DRAWINGS

FIG. 4 is a flowchart exemplifying steps of executing lower-limit maintenance control.

DETAILED DESCRIPTION

Figure 1:
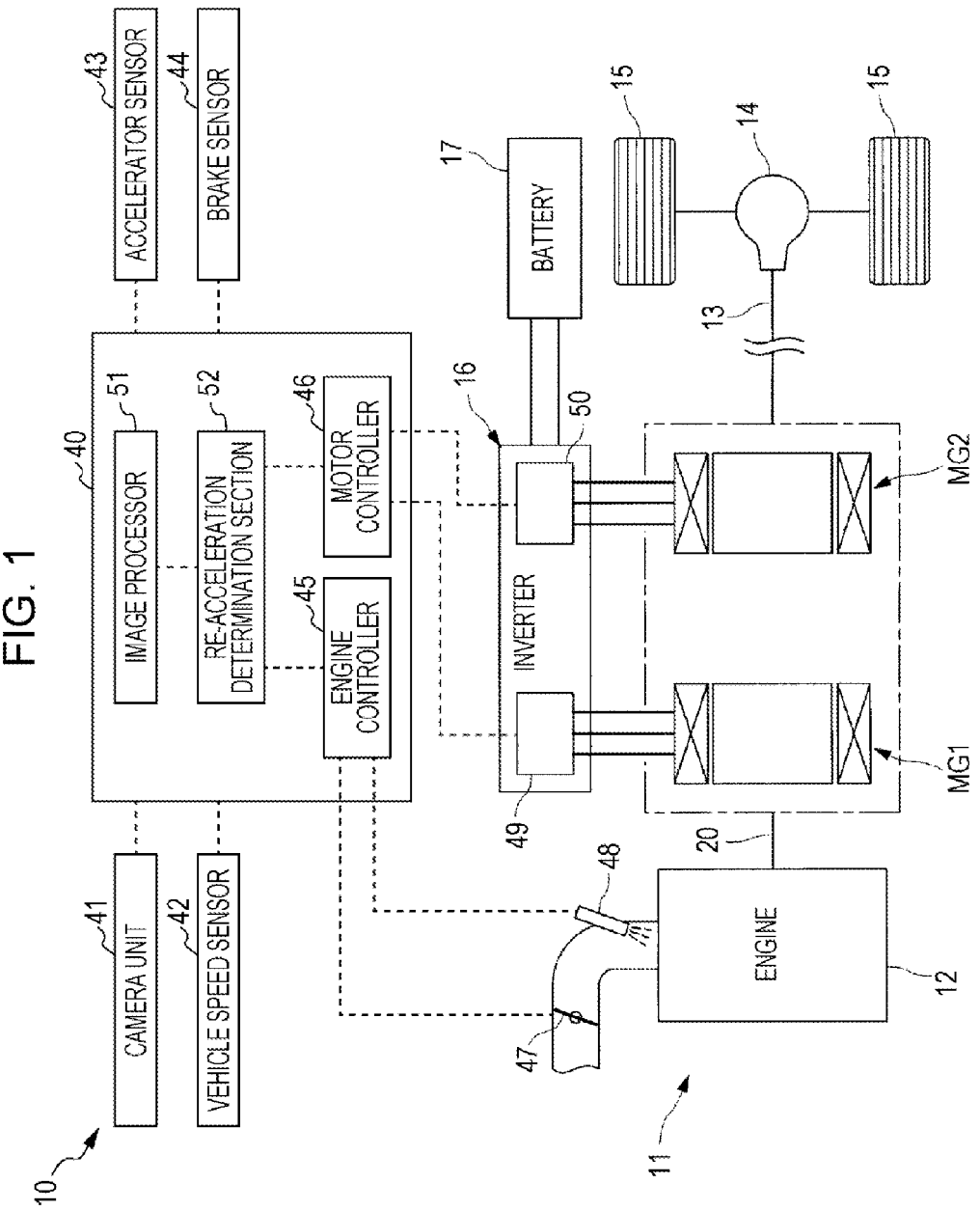
FIG. 1 is a diagram illustrating a vehicle controller according to a first example of the present invention.

Examples of the present invention will be described below with reference to the attached drawings. FIG. 1 is a diagram illustrating a vehicle controller 10 according to a first example of the present invention. As illustrated in FIG. 1, the vehicle controller 10 has a power unit 11 provided with a plurality of power sources. Specifically, the power unit 11 is provided with an engine 12 and two motor-generators MG1 and MG2 as power sources. An output shaft 13 of the power unit 11 is connected to wheels 15 through a differential mechanism 14. An inverter 16 is connected to the motor-generators MG1 and MG2, and a battery 17 is connected to the inverter 16.

Figure 2:
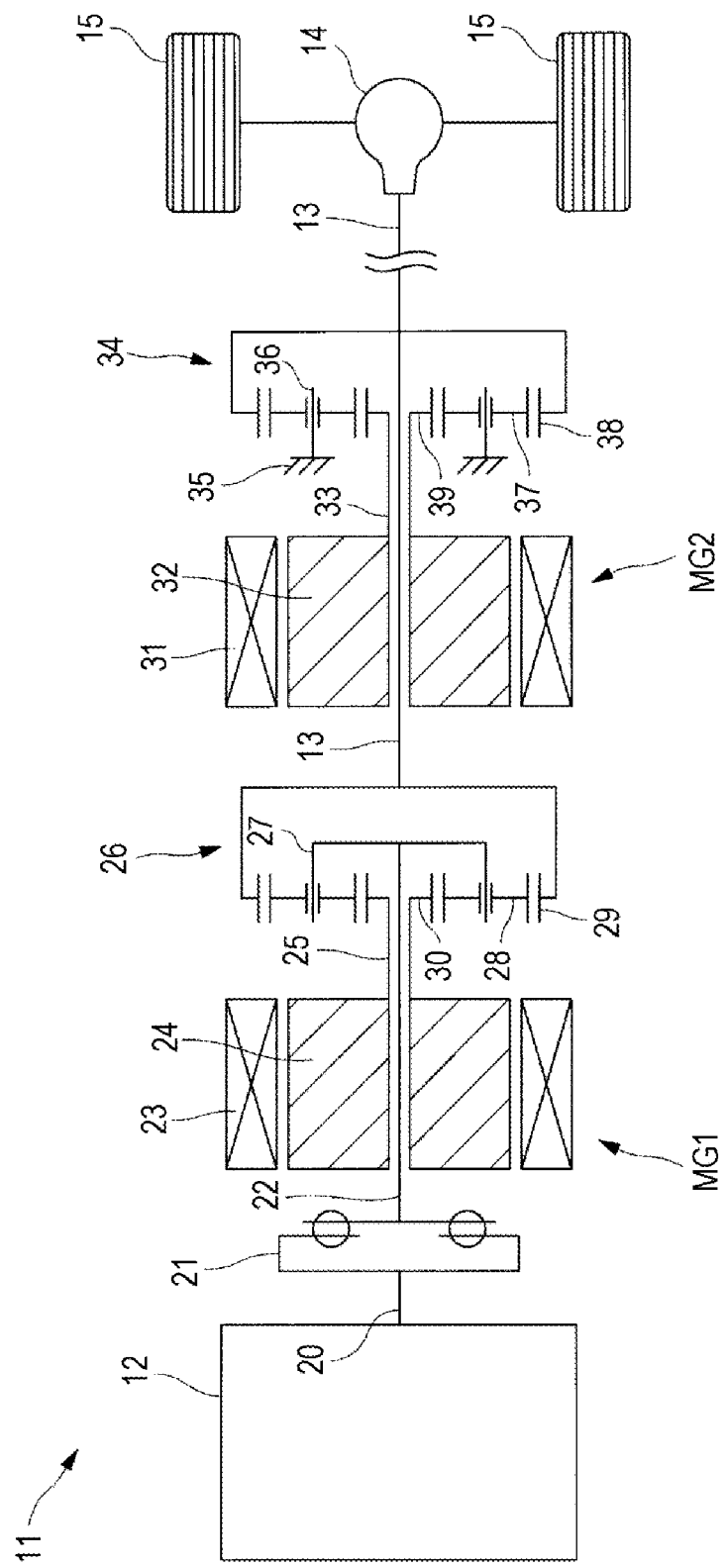
FIG. 2 is a diagram exemplifying an internal structure of a power unit.

FIG. 2 is a diagram exemplifying an internal structure of the power unit 11. As illustrated in FIG. 2, a crankshaft 20 of the engine 12 is connected to the input shaft 22 through the damper mechanism 21. The motor-generator (electric motor) MG1 coaxially provided on the input shaft 22 has a stator 23 and a rotor 24 housed in the stator 23. The rotor 24 is connected to a rotor shaft 25 that is hollow and that has the input shaft 22 inserted thereinto. A power dividing mechanism 26 consisting of a planetary pinion train is provided between the input shaft 22 of the power unit 11 and an output shaft 13. The power dividing mechanism 26 has a carrier 27 connected to the input shaft 22 and a pinion gear 28 rotatably supported by the carrier 27. The power dividing mechanism 26 also has a ring gear 29 connected to the output shaft 13 and a sun gear 30 connected to the rotor shaft 25. The ring gear 29 and the sun gear 30 are engaged with the pinion gear 28.

The motor-generator MG2 coaxially provided on the output shaft 13 has a stator 31 and a rotor 32 housed in the stator 31. The rotor 32 is connected to a rotor shaft 33 that is hollow and that has the input shaft 13 inserted thereinto. A planetary pinion train 34 disposed adjacent to the motor-generator MG2 has a carrier 36 secured to a housing 35 of the power unit 11 and a pinion gear 37 rotatably supported by the carrier 36. The planetary pinion train 34 has a ring gear 38 connected to the output shaft 13 and a sun gear 39 connected to the rotor shaft 33. The ring gear 38 and the sub gear 39 are engaged with the pinion gear 37.

The motor-generator MG1 of the power unit 11 is connected to the engine 12 through the power dividing mechanism 26 and to the output shaft 13 through the power dividing mechanism 26. The motor-generator MG2 of the power unit 11 is connected to the output shaft 13 through the planetary pinion train 34. In this manner, the power unit 11 is configured as a series-parallel type power unit. By controlling the rotational speed of the motor-generator MG1, the power unit 11 is capable of shutting down the engine 12 even while the vehicle is running and the output shaft 13 is rotating. Accordingly, during vehicle deceleration in which the depression of the accelerator pedal is released, the engine 12 is shut down in order to reduce the fuel consumption of the engine 12. In contrast, during vehicle acceleration in which the accelerator pedal is depressed, the engine 12 is started in order to gain motive power through engine torque.

The vehicle controller 10 has a control unit 40 that controls the operating conditions of the engine 12 and the motor-generators MG1 and MG2 and the like. The control unit 40 is connected to a camera unit 41 that captures an image ahead of the vehicle and serves as the sensor of the appended claims in the first example, a vehicle speed sensor 42 that detects a vehicle speed, an accelerator sensor 43 that detects the amount of accelerator pedal depression, and a brake sensor 44 that detects the amount of brake pedal depression. The control unit 40 has an engine controller 45 that controls the operating condition of the engine 12 and a motor controller 46 that controls the operating condition of the motor-generators MG1 and MG2.

The control unit 40 determines the operating condition based on information received from the sensors and calculates a control signal for the engine 12 and the motor-generators MG1 and MG2 based on the determination of the operating condition. The engine controller 45 outputs a control signal to a throttle valve 47 and an injector 48 and the like to control the engine torque and (rotational) speed of the engine 12. The motor controller 46 outputs a control signal to a power converter 49 in the inverter 16 to control the motor torque and speed of the motor-generator MG1. Also, the motor controller 46 outputs a control signal to a power converter 50 in the inverter 16 to control the motor torque and speed of the motor-generator MG2. The control unit 40 includes a CPU that calculates control signals, a ROM that stores programs and data, and a RAM that temporarily stores data.

Also, the control unit 40 has an image processor 51 and a re-acceleration determiner 52. The image processor 51 processes image information received from the camera unit 41 and detects preceding vehicle information that includes information on the driving condition of a preceding vehicle. Pieces of the preceding vehicle information detected by the image processor 51 include a vehicle speed of the preceding vehicle, a vehicle-to-vehicle distance between the vehicle and the preceding vehicle, and a status of activation of a preceding vehicle's brake lamp and the like. Based on the vehicle speed of the preceding vehicle that is preceding vehicle information, the re-acceleration determiner 52 determines whether or not a re-acceleration state occurs where the preceding vehicle decelerates and then accelerates. If the preceding vehicle is determined to be in the re-acceleration state, the engine controller 45 and the motor controller 46 perform lower-limit maintenance control for maintaining the engine speed not less than a predetermined lower limit in order to heighten the response associated with the acceleration of the vehicle.

Figures 3A, 3B, 3C:
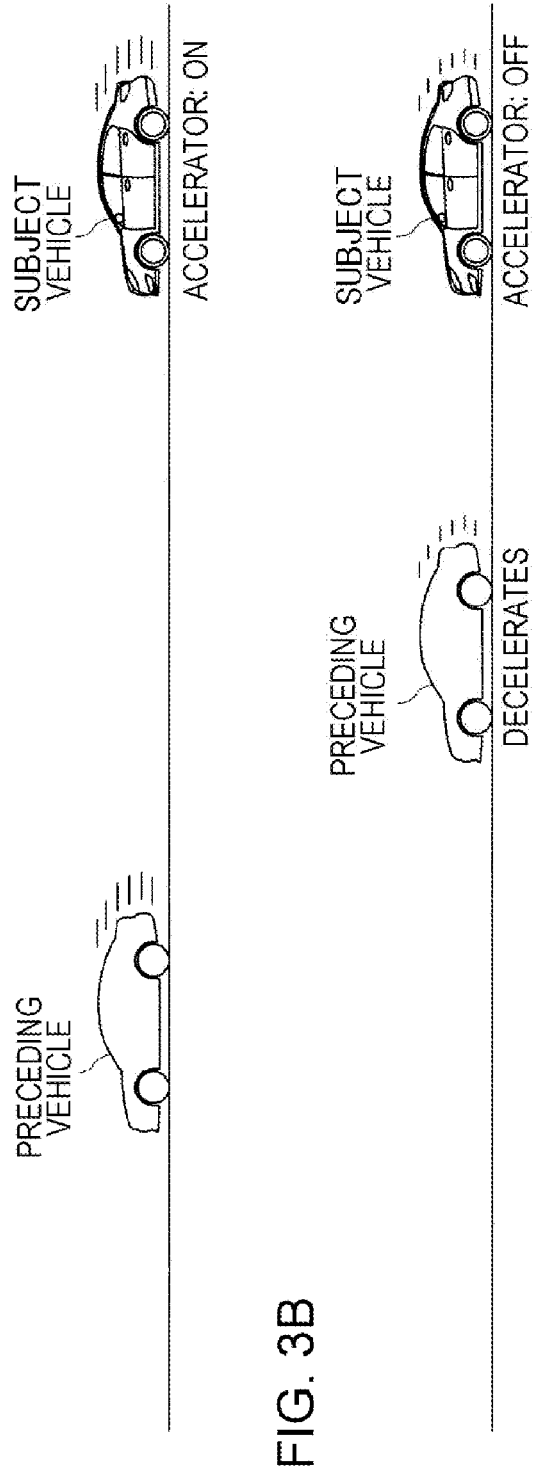
FIGS. 3A to 3C are schematic views illustrating a re-acceleration state of a preceding vehicle.

The lower-limit maintenance control for maintaining the engine speed not less than a lower limit is described below. The control unit 40 that performs the lower-limit maintenance control serves as the re-acceleration determiner and the rotation controller of the appended claims in the first example. FIGS. 3A through 3C are schematic views illustrating a re-acceleration state of a preceding vehicle. As illustrated in FIG. 3A, when there is a preceding vehicle ahead of a vehicle equipped with the vehicle controller 10 (hereinafter referred to as "subject vehicle"), the driver of the subject vehicle frequently adjusts the amount of accelerator pedal depression or accelerator opening so as to follow the preceding vehicle. Next, as illustrated in FIG. 3B, when the preceding vehicle decelerates, the vehicle-to-vehicle distance between the preceding vehicle and the subject vehicle decreases, prompting the driver of the subject vehicle to reduce the accelerator opening so as to increase the vehicle-to-vehicle distance. Then, as illustrated in FIG. 3C, when the preceding vehicle accelerates, the vehicle-to-vehicle distance increases, prompting the driver of the subject vehicle to increase the accelerator opening so as to reduce the vehicle-to-vehicle distance. In this way, in a situation where the preceding vehicle decelerates and then accelerates, it is predicted that re-acceleration of the preceding vehicle is followed by acceleration of the subject vehicle. Accordingly, the vehicle controller 10 according to the first example performs lower-limit maintenance control for maintaining the engine speed not less than a predetermined lower limit in order to heighten the response associated with acceleration of the subject vehicle following re-acceleration of the preceding vehicle.

Hereinafter, the lower-limit maintenance control is described. FIG. 4 is a flowchart exemplifying steps of executing the lower-limit maintenance control. Referring to FIG. 4, it is determined in step S10 whether or not a deceleration determination for the preceding vehicle and the subject vehicle is established. If it is determined in step S10 that a vehicle-speed decrement of the preceding vehicle is not less than a predetermined level within a predetermined duration, that a vehicle-speed decrement of the subject vehicle is not less than a predetermined level within a predetermined duration, and that elapsed time since setting of a deceleration flag to be described later falls within a predetermined duration, a deceleration determination is determined to have been established. If the deceleration determination is determined in step S10 to be established, the flow proceeds to step S11 in which the deceleration flag is set. On the contrary, if the deceleration determination is not determined in step S10 to have been established, the flow proceeds to step S12 in which the deceleration flag setting is cancelled.

It is determined in step S13 whether or not a re-acceleration determination for the preceding vehicle is established. If it is determined in step S13 that a vehicle-speed increment for the preceding vehicle is not less than a predetermined level within a predetermined duration and that the deceleration flag is set, the re-acceleration determination is determined to have been established. If the re-acceleration determination is determined in step S13 to have been established, the flow proceeds to step S14 in which a re-acceleration flag is set. On the contrary, if the re-acceleration determination is not determined in step S13 to have been established, the flow proceeds to step S15 in which the re-acceleration flag setting is cancelled.

It is determined in step S16 whether or not a shutdown inhibition determination for inhibiting an engine shutdown is established. If it is determined in step S16 that a re-acceleration flag is set and that elapsed time since setting of a shutdown inhibition flag to be described later falls within a predetermined duration, the shutdown inhibition determination is determined to have been established. In other words, if it is determined in step S16 that elapsed time since re-acceleration of the preceding vehicle falls within a predetermined duration, the shutdown inhibition determination is determined to have been established. Then, if the shutdown inhibition determination is determined to have been established, the flow proceeds to step S17 in which it is determined whether or not a continuation condition for the shutdown inhibition determination is established. If it is determined in step S17 that a predetermined duration elapses since the setting of the re-acceleration flag described above and that a brake operation of the subject vehicle is cancelled, the continuation condition for the shutdown inhibition determination is determined to have been established. Also, if it is determined in step S17 that a predetermined duration elapses since the setting of the re-acceleration flag described above and that a vehicle-speed decrement of the subject vehicle is not more than a predetermined level within a predetermined duration, the continuation condition for the shutdown inhibition determination is determined to have been established. If the continuation condition is determined in step S17 to have been established, the flow proceeds to step S18 in which the shutdown inhibition flag is set. On the contrary, if the shutdown inhibition determination is not determined in step S16 to have been established or the continuation condition is not determined in step S17 to have been established, the flow proceeds to step S19 in which the shutdown inhibition flag setting is cancelled.

In subsequent step S20, it is determined whether or not the shutdown inhibition flag is set. If the shutdown inhibition flag determined in step S20 to have been set, the flow proceeds to step S21 in which it is determined whether or not motoring of the engine 12 by the motor-generator MG1 is possible. If it is determined in step S21 that the state of charge (SOC) of the battery 17 is not less than a predetermined level and that the engine speed is not less than a predetermined level, such motoring is determined to be possible. If the motoring is determined in step S21 to be possible, the flow proceeds to step S22 to perform the lower-limit maintenance control for maintaining the engine speed not less than a predetermined lower limit speed (lower limit) N1 by driving the motor-generator MG1.

On the contrary, if the motoring is determined in step S21 to be impossible, the flow proceeds to step S23 to perform the lower-limit maintenance control for maintaining the engine speed not less than a predetermined idling speed (lower limit) N2 by causing fuel to be injected through the injector 48. In other words, if it is determined in step S21 that the state of charge (SOC) of the battery 17 is insufficient or that the engine speed has already fallen below the lower limit speed N1, the flow proceeds to step S23 in which the engine speed is maintained at the idling speed N2. If the shutdown inhibition flag setting is determined in step S20 to have been cancelled, the flow proceeds to step S24 in which the lower-limit maintenance control for maintaining the engine speed is performed and the engine 12 is shut down depending on a vehicle condition.

As described above, if re-acceleration of the preceding vehicle is detected, the engine shutdown of the subject vehicle is inhibited and at the same time the engine speed is maintained by the motor-generator MG1. With this arrangement, when the driver of the subject vehicle depresses the accelerator pedal, engine torque can be generated quickly, thereby allowing the response associated with vehicle acceleration to be enhanced. If the engine speed has already fallen below the lower limit speed N1, the idling speed is maintained by causing fuel to be injected through the injector 48, instead of increasing the engine speed through motoring. Accordingly, the response associated with vehicle acceleration can be enhanced by maintaining the idling speed N2 without shutting down the engine 12. Also, if the engine speed is below the lower limit speed N1, injection of fuel is used to maintain the engine 12 at the idling speed, thereby suppressing power consumption of the motor-generator MG1 associated with the motoring. Furthermore, in step S17, a determination as to the continuation condition is made to determine whether the driver of the subject vehicle intends to accelerate. In other words, if it is determined in step S17 that the driver is operating the brake, namely, the driver expresses a clear intention to decelerate, the lower-limit maintenance control is cancelled and the engine 12 is shut down. With this arrangement, vehicle fuel economy can be improved even if the lower-limit maintenance control is performed to enhance vehicle acceleration.

Figure 5:
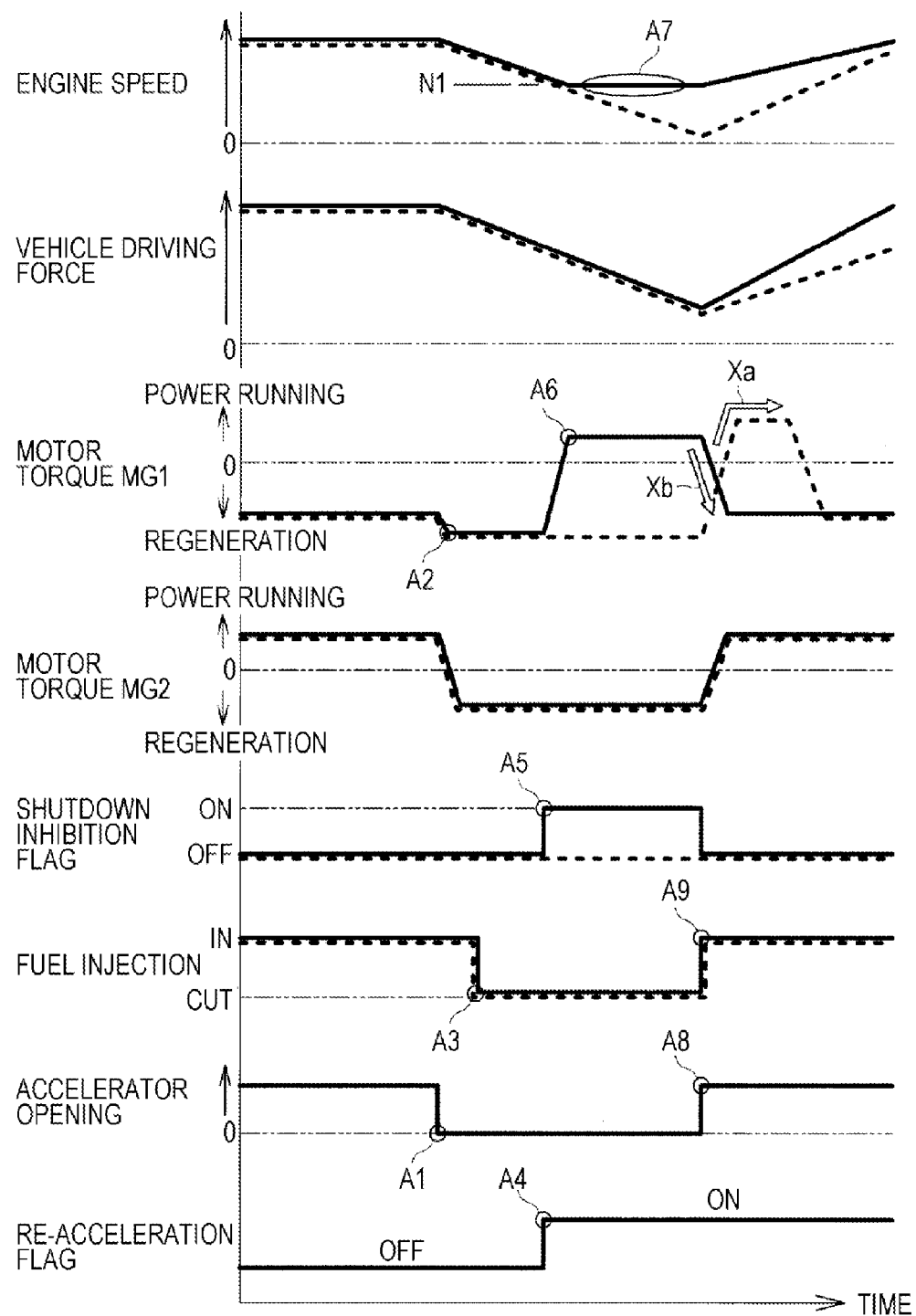
FIG. 5 is a timing chart exemplifying an execution of lower-limit maintenance control through motoring.
Figure 6:
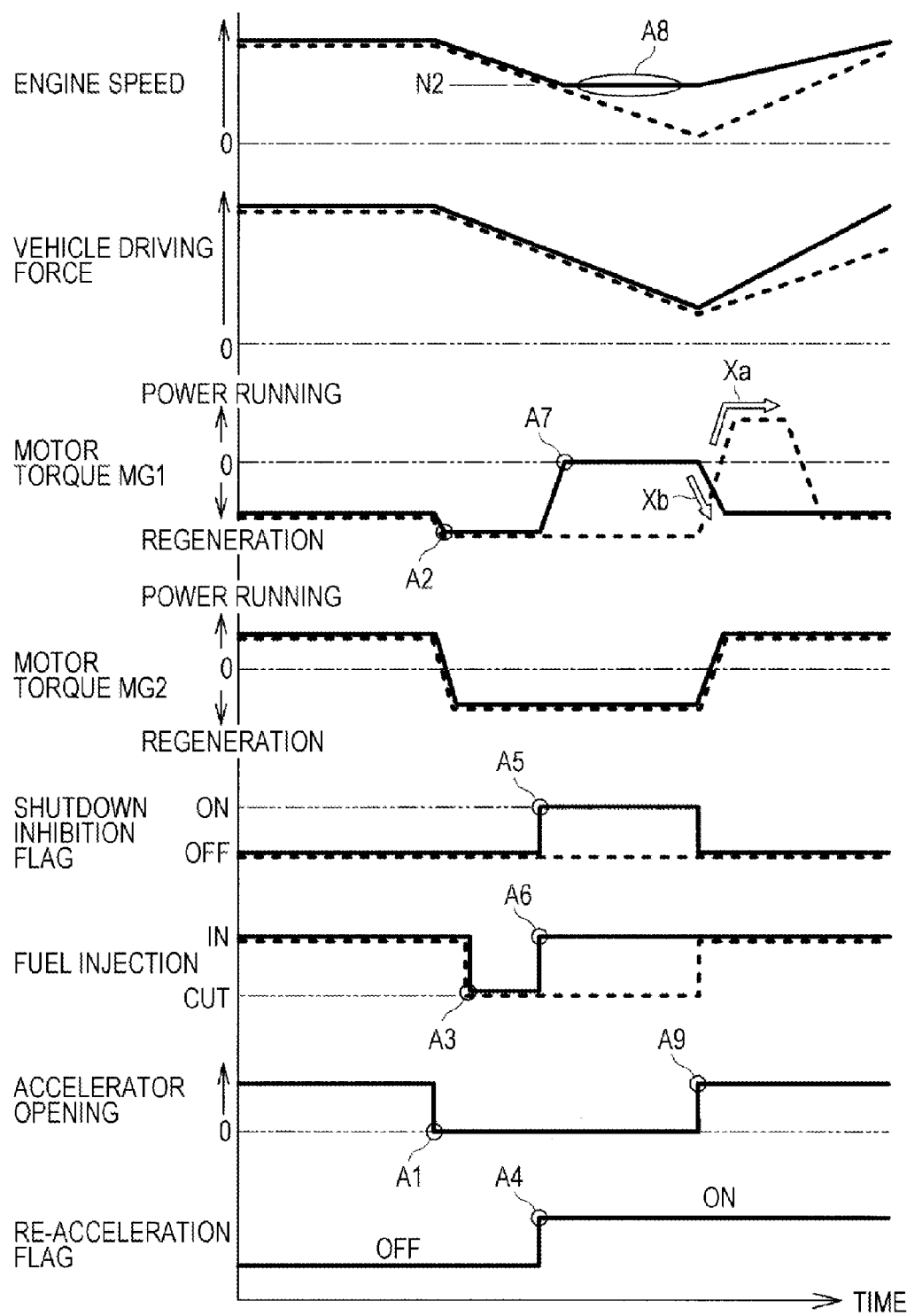
FIG. 6 is a timing chart exemplifying an execution of lower-limit maintenance control through fuel supply.
Figure 7:
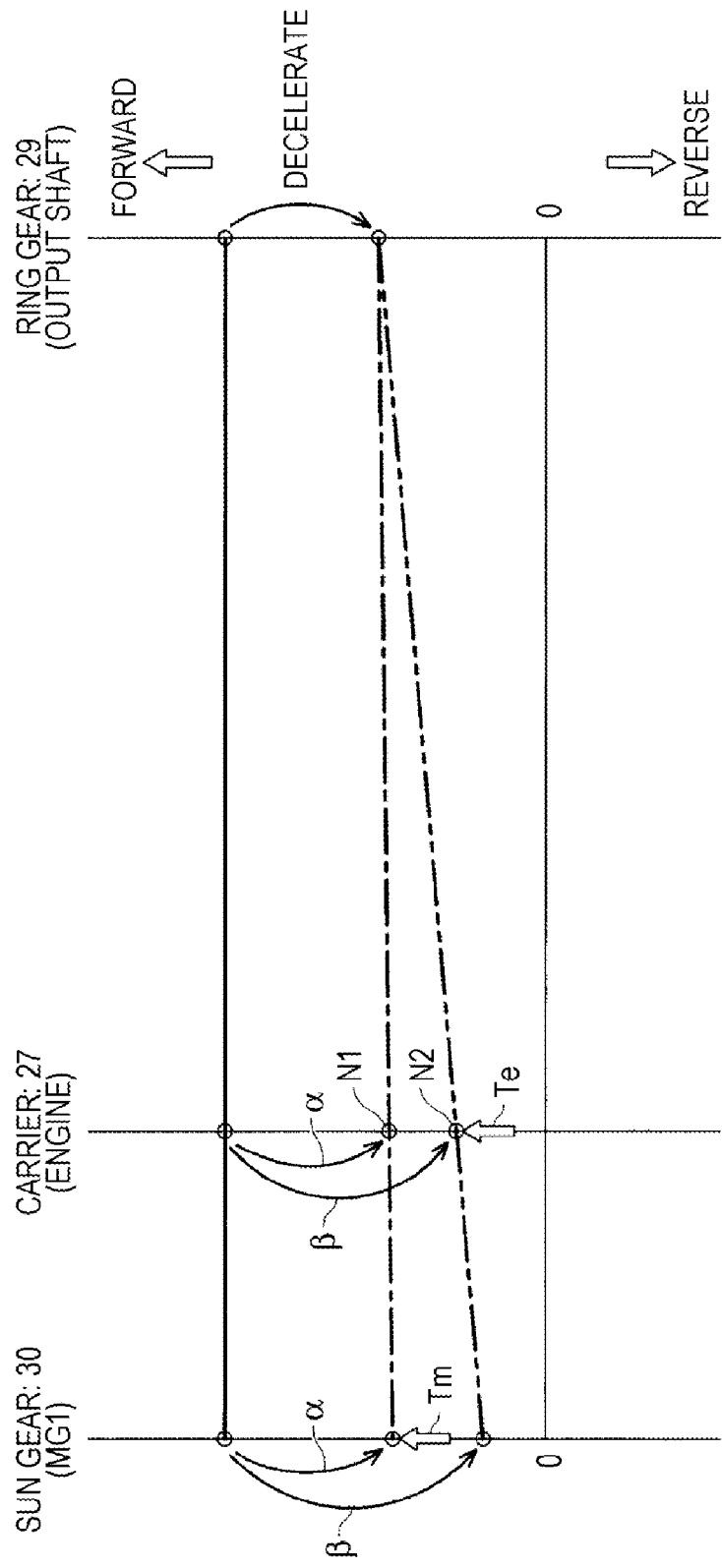
FIG. 7 is a collinear diagram depicting an operation of a power dividing mechanism during execution of lower-limit maintenance control.

Next, the lower-limit maintenance control is described. FIG. 5 is a timing chart exemplifying the execution of the lower-limit maintenance control through motoring. FIG. 6 is a timing chart exemplifying the execution of the lower-limit maintenance control through fuel supply. In FIGS. 5 and 6, solid lines indicate the case where the lower-limit maintenance control is enabled, while dashed lines indicate the case where the lower-limit maintenance control is disabled. FIG. 7 is a collinear diagram depicting an operation of the power dividing mechanism 26 during execution of the lower-limit maintenance control.

Referring to FIG. 5, when the depression of the accelerator pedal is released in conjunction with the deceleration of the preceding vehicle (symbol A1), regeneration of the motor-generator MG1 is enabled in preparation for engine shutdown (symbol A2) and injection of fuel is suspended in preparation for engine shutdown (symbol A3). Then, when the re-acceleration flag is set in conjunction with the re-acceleration of the preceding vehicle (symbol A4), the shutdown inhibition flag of the engine 12 is set (symbol A5). When the shutdown inhibition flag is set, the motor-generator MG1 is powered (symbol A6), thereby maintaining the engine speed not less than the lower limit speed N1 (symbol A7). In other words, as illustrated by symbol α in FIG. 7, for lower-limit maintenance control through motoring, the motor-generator MG1 is caused to output power running torque Tm, whereby the engine speed declining in preparation for vehicle deceleration followed by engine shutdown is maintained not less than the lower limit speed N1.

Referring to FIG. 5, when the accelerator pedal of the subject vehicle is depressed for re-acceleration (symbol A8), maintaining the engine speed through motoring allows injection of fuel through the injector 48 to be resumed (symbol A9), thereby promptly increasing engine torque and engine speed. Accordingly, it is not necessary to wait for the engine to be started up and revved up, thereby improving the response associated with vehicle acceleration. When the engine speed is maintained through motoring, injection of fuel into the engine 12 is shut down. This prevents degradation of vehicle fuel economy even when the lower-limit maintenance control is executed. When the accelerator pedal is depressed, the lower-limit maintenance control through motoring is cancelled. If the depression of the accelerator pedal is released, electric power regeneration of the motor-generator MG2 is enabled in order to decelerate the vehicle, while, if the accelerator pedal is depressed, the motor-generator MG2 is powered to accelerate the vehicle.

As illustrated by dashed lines and arrows Xa in FIG. 5, if the accelerator pedal is depressed for re-acceleration while the engine speed is declining, it is necessary to temporarily power the motor-generator MG1 in order to increase the engine speed. In contrast, as illustrated by solid lines and arrows Xb in FIG. 5, if the accelerator pedal is depressed for re-acceleration while the engine speed is maintained, regeneration of the motor-generator MG1 can be promptly enabled. The regeneration of the motor-generator MG1 leads to acceleration of the ring gear 29 and the output shaft 13 and, as a result, acceleration of the vehicle. In other words, the execution of the lower-limit maintenance control through motoring allows the regeneration of the motor-generator MG1 to be promptly enabled, thereby improving the response associated with vehicle acceleration.

Referring to FIG. 6, when the depression of the accelerator pedal is released in conjunction with the deceleration of the preceding vehicle (symbol A1), regeneration of the motor-generator MG1 is enabled in preparation for engine shutdown (symbol A2) and injection of fuel is suspended in preparation for engine shutdown (symbol A3). Then, when the re-acceleration flag is set in conjunction with the re-acceleration of the preceding vehicle (symbol A4), the shutdown inhibition flag of the engine 12 is set (symbol A5). For instance, if the state of charge (SOC) of the battery 17 is too low to enable the lower-limit maintenance control through motoring, injection of fuel into the engine 12 is resumed (symbol A6) and the motor-generator MG1 is subjected to zero torque control (symbol A7). With this arrangement, the engine 12 is controlled so as to keep an idling state, resulting in the engine speed being maintained not less than the idling speed N2 (symbol A8). In other words, as illustrated by symbol β in FIG. 7, for the lower-limit maintenance control through fuel supply, the engine 12 is caused to output engine torque Te, whereby the engine speed declining in preparation for vehicle deceleration followed by engine shutdown is maintained not less than the idling speed N2.

Referring to FIG. 6, when the accelerator pedal of the subject vehicle is depressed for re-acceleration (symbol A9), maintaining the engine speed through injection of fuel allows engine torque and engine speed to be quickly generated. Accordingly, it is not necessary to wait for the engine to be started up and revved up, thereby improving the response associated with vehicle acceleration. When the accelerator pedal is depressed, the lower-limit maintenance control through fuel supply is cancelled. If the depression of the accelerator pedal is released, regeneration of the motor-generator MG2 is enabled in order to decelerate the vehicle, while, if the accelerator pedal is depressed, the motor-generator MG2 is powered in order to accelerate the vehicle.

As illustrated by dashed lines and arrows Xa in FIG. 6, if the accelerator pedal is depressed for re-acceleration while the engine speed is declining, it is necessary to temporarily power the motor-generator MG1 in order to increase the engine speed. In contrast, as illustrated by solid lines and arrows Xb in FIG. 6, if the accelerator pedal is depressed for re-acceleration while the engine speed is maintained, regeneration of the motor-generator MG1 can be promptly enabled. The regeneration of the motor-generator MG1 leads to acceleration of the ring gear 29 and the output shaft 13 and, as a result, acceleration of the vehicle. In other words, the execution of the lower-limit maintenance control through fuel supply allows the regeneration of the motor-generator MG1 to be promptly enabled, thereby improving the response associated with vehicle acceleration.

Figure 8:
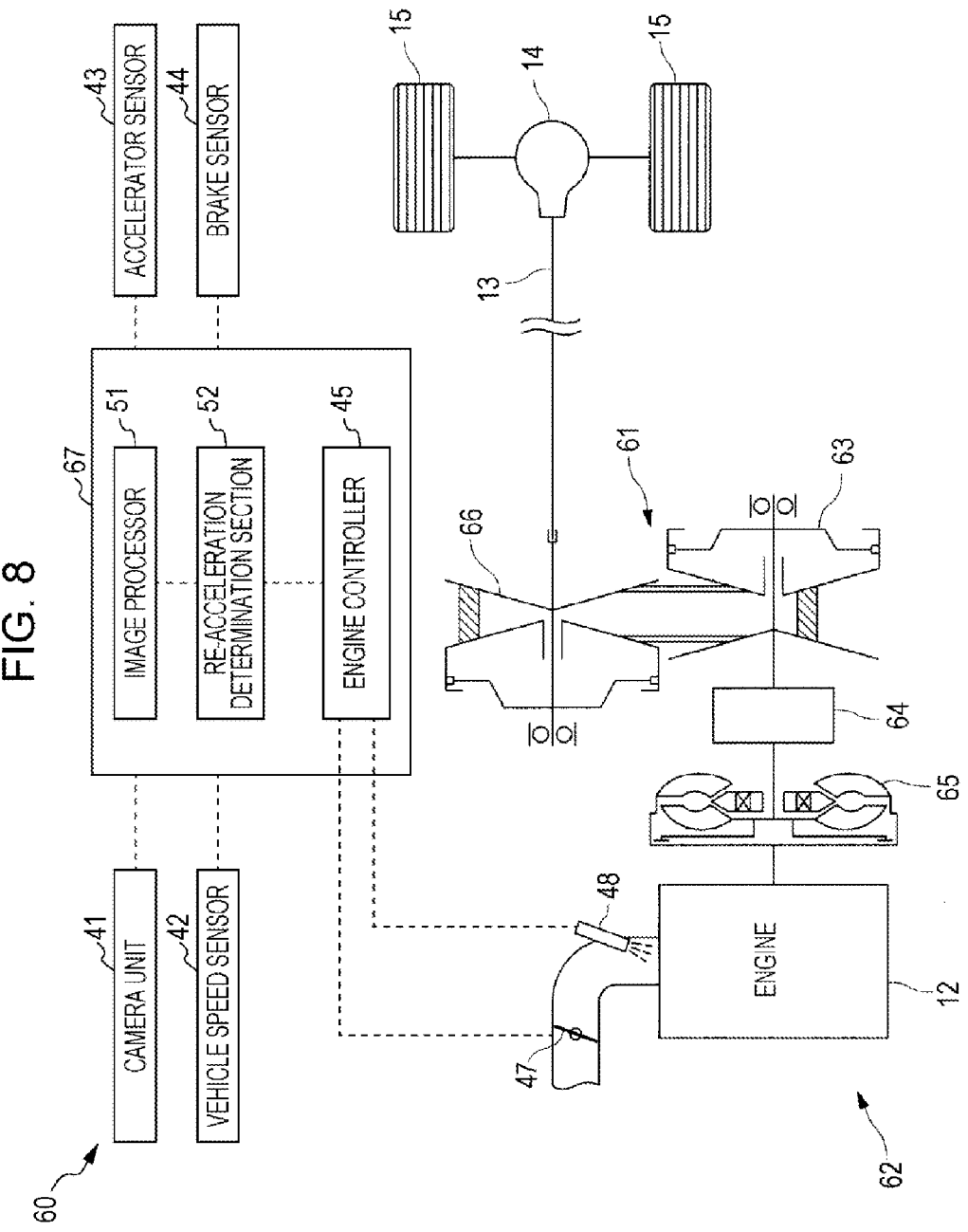
FIG. 8 is a diagram illustrating a vehicle controller according to a second example of the present invention.

Next, a second example according to the present invention is described below. FIG. 8 is a diagram illustrating a vehicle controller 60 according to the second example. In FIG. 8, components that are identical to components illustrated in FIG. 1 are denoted by like reference numerals and symbols, and descriptions thereof are omitted. Referring to FIG. 8, a vehicle controller 60 has a power unit 62 provided with an engine 12 and a continuously variable transmission 61. A primary pulley 63 of the continuously variable transmission 61 is connected to the engine 12 through a forward/backward switching mechanism 64 and a torque converter 65. A secondary pulley 66 of the continuously variable transmission 61 is connected to wheels 15 through an output shaft 13 and a differential mechanism 14. The vehicle controller 60 has an idling stop function that automatically shuts down the engine 12 before the vehicle comes to a stop. Such an idling stop function allows the engine 12 to be shut down before the vehicle comes to a stop below a predetermined speed, thereby improving vehicle fuel economy.

The vehicle controller 60 has a control unit 67 that controls the operating conditions of the engine 12 and the continuously variable transmission 61. The control unit 67 determines the operating condition based on information received from various sensors and calculates a control signal for the engine 12 and the continuously variable transmission 61 based on the determination of the operating condition. An engine controller 45 outputs a control signal to a throttle valve 47 and an injector 48 and the like to control the engine torque and engine speed of the engine 12. Also, an image processor 51 of the control unit 67 processes image information received from a camera unit 41 and detects preceding vehicle information that includes information on the driving condition of a preceding vehicle. Furthermore, a re-acceleration determiner 52 of the control unit 67 makes a determination based on the vehicle speed or the like of the preceding vehicle, which is the preceding vehicle information, as to whether a re-acceleration state occurs where the preceding vehicle decelerates and then accelerates. If it is determined that the preceding vehicle is in the re-acceleration state, the engine controller 45 of the control unit 67 performs lower-limit maintenance control for maintaining the engine speed not less than a predetermined lower limit in order to heighten the response associated with the acceleration of the vehicle. As described above, the control unit 67 that performs the lower-limit maintenance control serves as the re-acceleration determiner and the rotation controller in the appended claims in the second example. The control unit 67 includes a CPU that calculates control signals, a ROM that stores programs and data, and a RAM that temporarily stores data.

Figure 9:
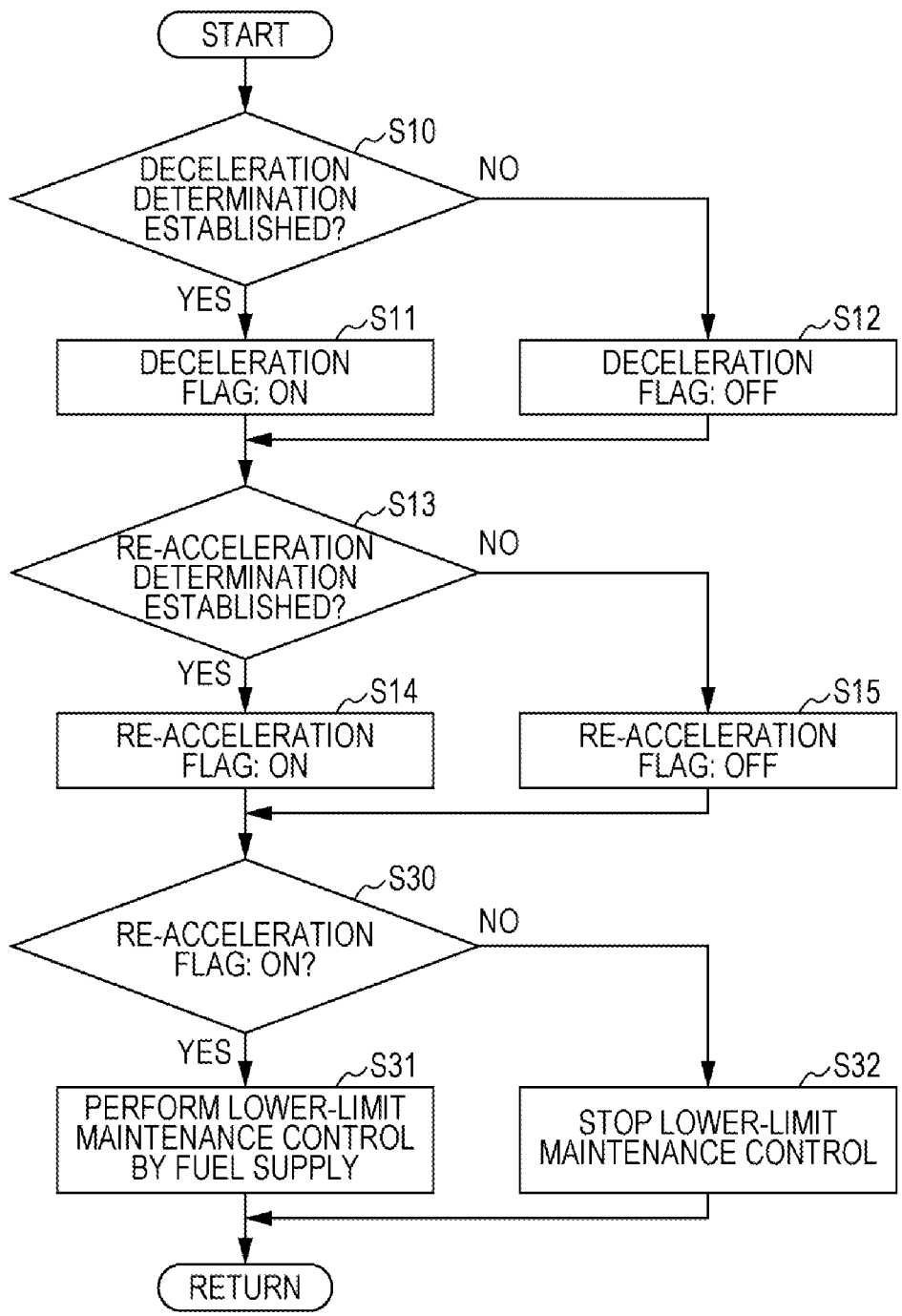
FIG. 9 is a flowchart exemplifying steps of executing lower-limit maintenance control.

Hereinafter, the lower-limit maintenance control performed by the control unit 67 is described. FIG. 9 is a flowchart exemplifying the steps of executing the lower-limit maintenance control. In FIG. 9, steps that are identical to steps illustrated in FIG. 4 are denoted by like reference numerals, and descriptions thereof are omitted. As illustrated in FIG. 9, when a re-acceleration flag is set in step S14 or when a re-acceleration flag setting is cancelled in step S15, the flow proceeds to step S30 in which it is determined whether or not the re-acceleration flag has been set. If the re-acceleration flag is determined in step S30 to have been set, the flow proceeds to step S31 in which fuel is caused to be injected through the injector 48 to perform the lower-limit maintenance control for maintaining the engine speed not less than a predetermined lower limit speed (lower limit) N3. On the contrary, if the re-acceleration flag is not determined in step S30 to have been set, the flow proceeds to step S32 in which the lower-limit maintenance control for maintaining the engine speed is disabled and the engine 12 is shut down depending on vehicle conditions.

Figure 10:
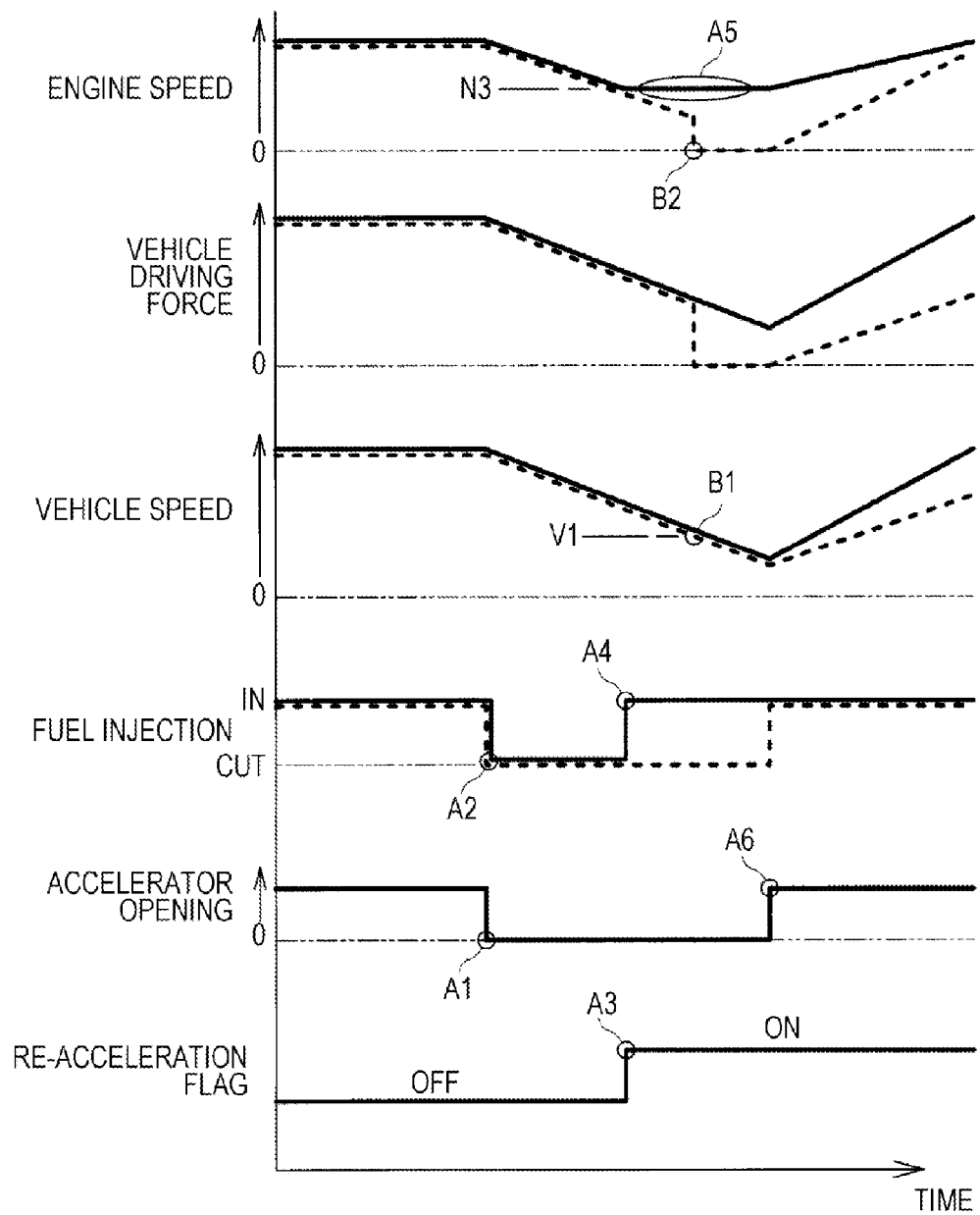
FIG. 10 is a timing chart exemplifying the execution of lower-limit maintenance control through fuel supply.

Next, the lower-limit maintenance control described above. FIG. 10 is a timing chart exemplifying the execution of the lower-limit maintenance control through fuel supply. In FIG. 10, solid lines indicate the case where the lower-limit maintenance control is enabled, while dashed lines indicate the case where the lower-limit maintenance control is disabled. Referring to FIG. 10, when the depression of the accelerator pedal is released in conjunction with the deceleration of the preceding vehicle (symbol A1), injection of fuel into the engine 12 is suspended (symbol A2). Then, when the re-acceleration flag is set in conjunction with the re-acceleration of the preceding vehicle (symbol A3), injection of fuel into the engine 12 is resumed (symbol A4), causing the engine speed to be maintained not less than a predetermined speed N3 (symbol A5). As described above, if the accelerator pedal of a vehicle equipped with the vehicle controller 60 (hereinafter referred to as "subject vehicle") is depressed for re-acceleration (symbol A6), maintaining the engine speed allows engine toque and engine speed to be promptly generated. Accordingly, it is not necessary to wait for the engine to be started up and revved up, thereby improving the response associated with vehicle acceleration.

With the lower-limit maintenance control disabled, the engine 12 is shut down (symbol B2) when the vehicle speed falls below a vehicle-speed threshold V1 for idling stop (symbol B1). The engine 12 being shut down makes it impossible to promptly increase engine torque when the accelerator pedal is depressed (symbol A6), resulting in degraded response associated with vehicle acceleration. In contrast, since the vehicle controller 60 executes the lower-limit maintenance control, it is not necessary to wait for the engine to be started up and revved up, thereby improving the response associated with vehicle acceleration.

The present invention is not limited to the foregoing examples. Various modifications are conceivable within the scope of the present invention. In the above description, a determination as to re-acceleration of a preceding vehicle is made on the basis of the speed of the preceding vehicle, but the present invention is not limited to this. Such a determination as to re-acceleration of the preceding vehicle may be made on the basis of, for instance, a vehicle-to-vehicle distance between the preceding vehicle and the subject vehicle. Alternatively, the determination as to re-acceleration of the preceding vehicle may be made on the basis of the activation of the brake lamp of the preceding vehicle.

The lower-limit maintenance control through motoring and the lower-limit maintenance control through fuel supply are enabled separately in the above description, but the present invention is not limited to this. Alternatively, for instance, the motoring of the engine 12 by the motor-generator MG1 may be performed concurrently with the fuel supply to the engine 12 in order to maintain the engine speed not less than the lower limit speed.

The camera unit 41 is used to detect the driving condition of the preceding vehicle in the above description. The camera unit 41 may have a plurality of cameras or a single camera. A sensor used to detect the driving condition of the preceding vehicle is not limited to the camera. Alternatively, for instance, a millimeter wave radar or an infrared laser may be used.

The vehicle controllers 10 and 60 according to the examples of the present invention are applied to a series-parallel-type hybrid vehicle and a vehicle provided with the engine 12 only as a power source in the above description, but the present invention is not limited to this. Alternatively, the present invention may be applied to, for instance, series type hybrid vehicles or parallel type hybrid vehicles.

The invention claimed is:

1. A vehicle controller comprising:
    a sensor that detects a driving condition of a preceding vehicle;
    a re-acceleration determiner configured to determine, based on the driving condition of the preceding vehicle and the subject vehicle, whether or not a re-acceleration state where the preceding vehicle decelerates and then accelerates occurs, wherein the re-acceleration determiner determines that the preceding vehicle is in the re-acceleration state when the preceding vehicle is accelerated from a state in which both the preceding vehicle and the subject vehicle are decelerating; and
    a rotation controller that, when the re-acceleration determiner determines that the preceding vehicle is in the re-acceleration state, maintains a rotational speed of an engine not less than a lower limit, wherein the lower limit is higher than an idling speed.

2. The vehicle controller according to claim 1, further comprising:
    an electric motor connected to the engine,
    wherein the rotation controller drives the electric motor to maintain the rotational speed of the engine not less than a lower limit.

3. The vehicle controller according to claim 2,
    wherein the rotation controller shuts down fuel supply to the engine to maintain the rotational speed of the engine not less than a lower limit.

4. The vehicle controller according to claim 1,
    wherein the rotation controller supplies fuel to the engine to maintain the rotational speed of the engine not less than a lower limit.

5. The vehicle controller according to claim 1,
    wherein, when a driver of the vehicle equipped with the vehicle controller performs a brake operation, the rotation controller disables a lower-limit maintenance control that maintains the rotational speed of the engine not less than a lower limit.

6. The vehicle controller according to claim 2,
    wherein, when a driver of the vehicle equipped with the vehicle controller performs a brake operation, the rotation controller disables a lower-limit maintenance control that maintains the rotational speed of the engine not less than a lower limit.

7. The vehicle controller according to claim 3,
    wherein, when a driver of the vehicle equipped with the vehicle controller performs a brake operation, the rotation controller disables a lower-limit maintenance control that maintains the rotational speed of the engine not less than a lower limit.

8. The vehicle controller according to claim 4,
    wherein, when a driver of the vehicle equipped with the vehicle controller performs a brake operation, the rotation controller disables a lower-limit maintenance control that maintains the rotational speed of the engine not less than a lower limit.

* * * * *